(12) United States Patent
Creekbaum et al.

(10) Patent No.: US 10,452,761 B2
(45) Date of Patent: *Oct. 22, 2019

(54) SYSTEM, METHOD, AND SOFTWARE APPLICATION FOR DISPLAYING DATA FROM A WEB SERVICE IN A VISUAL MAP

(71) Applicant: COREL CORPORATION, Ottawa (CA)

(72) Inventors: William J. Creekbaum, San Mateo, CA (US); Michael B. Jetter, Corte Madera, CA (US); Steven Bashford, Johannesberg (DE)

(73) Assignee: Corel Corporation, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,770

(22) Filed: Jul. 18, 2016

(65) Prior Publication Data

US 2016/0328367 A1 Nov. 10, 2016

Related U.S. Application Data

(63) Continuation of application No. 14/726,856, filed on Jun. 1, 2015, now Pat. No. 9,396,282, which is a (Continued)

(51) Int. Cl.
*G06F 17/00* (2006.01)
*G06F 17/22* (2006.01)
(Continued)

(52) U.S. Cl.
CPC ........ *G06F 17/227* (2013.01); *G06F 3/04847* (2013.01); *G06F 17/212* (2013.01);
(Continued)

(58) Field of Classification Search
None
See application file for complete search history.

(56) References Cited

U.S. PATENT DOCUMENTS 5,546,529 A * 8/1996 Bowers ................. G06F 3/0489
707/E17.141
6,070,176 A * 5/2000 Downs .............. G06F 17/30696
707/E17.082

(Continued)

*Primary Examiner* — Howard Cortes
(74) *Attorney, Agent, or Firm* — Rosenberg, Klein & Lee

(57) ABSTRACT

The present invention provides a system, method, and software application for enabling a user to view data from an external data source in a visual map, wherein the external data source has a web services interface. Visual mapping software on a computer provides a visual mapping interface in which a user can create, edit, and/or view a visual map. Within the visual mapping interface, the visual mapping software provides the user with an option to obtain data from one or more data sources associated with a web service. In response to the user selecting a data source associated with a web service, the visual mapping software builds a web service request for the web service associated with the selected data source. The visual mapping application makes a call to the applicable web service with the web service request. The visual mapping application subsequently receives data from the web service and transforms the data into a format that can be used to generate visual map data. The visual mapping software then displays the data in a visual map.

26 Claims, 8 Drawing Sheets

Related U.S. Application Data continuation of application No. 12/291,495, filed on Nov. 10, 2008, now Pat. No. 9,047,388, which is a continuation-in-part of application No. 10/882,556, filed on Jul. 1, 2004, now Pat. No. 9,038,001.

(51) Int. Cl.

| | | |
|---|---|---|
| *G06F 17/21* | (2006.01) | |
| *G06F 17/24* | (2006.01) | |
| *G06F 17/30* | (2006.01) | |
| *G06F 3/0484* | (2013.01) | |
| *G06Q 10/10* | (2012.01) | |
| *G06Q 40/04* | (2012.01) | |
| *H04L 29/08* | (2006.01) | |

(52) U.S. Cl.
CPC ........ *G06F 17/2247* (2013.01); *G06F 17/24* (2013.01); *G06F 17/30716* (2013.01); *G06F 17/30867* (2013.01); *G06F 17/30905* (2013.01); *G06F 17/30917* (2013.01); *G06F 17/30929* (2013.01); *G06Q 10/105* (2013.01); *G06Q 40/04* (2013.01); *H04L 67/02* (2013.01)

(56) References Cited

U.S. PATENT DOCUMENTS

| | | | | |
|---|---|---|---|---|
| 6,175,830 B1* | 1/2001 | Maynard | ............ | G06F 17/30873 |
| 6,182,065 B1* | 1/2001 | Yeomans | .......... | G06F 17/30864 |
| | | | | 707/706 |
| 6,434,556 B1* | 8/2002 | Levin | ................ | G06F 17/30696 |
| 6,704,024 B2* | 3/2004 | Robotham | ................ | G06F 3/14 |
| | | | | 345/581 |
| 6,732,088 B1* | 5/2004 | Glance | ............. | G06F 17/30864 |
| 7,047,243 B2* | 5/2006 | Cabrera | ............. | G06F 17/3089 |
| 7,065,532 B2* | 6/2006 | Elder | ............... | G06F 17/30722 |
| 7,080,092 B2* | 7/2006 | Upton | .................... | G06F 9/541 |
| 7,107,285 B2* | 9/2006 | von Kaenel | ....... | G06F 17/30241 |
| 7,269,664 B2* | 9/2007 | Hutsch | .................... | G06F 9/541 |
| | | | | 345/672 |
| 7,373,612 B2* | 5/2008 | Risch | ................ | G06F 17/30716 |
| | | | | 707/E17.093 |
| 7,447,688 B2* | 11/2008 | Dietz | ................ | G06F 17/30867 |
| 7,543,299 B2* | 6/2009 | Goodman | ................ | G06F 8/34 |
| | | | | 709/218 |
| 7,610,575 B2* | 10/2009 | Sproule | ................ | G06Q 10/063 |
| | | | | 705/348 |
| 7,856,601 B2* | 12/2010 | Moore | ............. | G06F 17/30867 |
| | | | | 355/27 |
| 7,861,151 B2* | 12/2010 | Milic-Frayling | ............................ | |
| | | | | G06F 17/30882 |
| | | | | 715/200 |
| 2002/0049750 A1* | 4/2002 | Venkatram | ............. | G06N 5/022 |
| 2002/0055919 A1* | 5/2002 | Mikheev | ............. | G06F 17/30675 |
| 2003/0218640 A1* | 11/2003 | Noble-Thomas | ............................ | |
| | | | | G06F 17/30554 |
| | | | | 715/853 |
| 2003/0233631 A1* | 12/2003 | Curry | ........................ | G06F 8/20 |
| | | | | 717/100 |
| 2004/0030741 A1* | 2/2004 | Wolton | ............. | G06F 17/30873 |
| | | | | 709/202 |
| 2004/0083199 A1* | 4/2004 | Govindugari | ..... | G06F 17/30303 |
| 2004/0098732 A1* | 5/2004 | Clement | ............ | G06F 17/3089 |
| | | | | 719/328 |
| 2005/0054381 A1* | 3/2005 | Lee | ......................... | G06F 3/011 |
| | | | | 455/557 |
| 2005/0060287 A1* | 3/2005 | Hellman | ........... | G06F 17/30705 |
| 2006/0005164 A1* | 1/2006 | Jetter | .................... | G06F 17/212 |
| | | | | 717/113 |

* cited by examiner

SYSTEM, METHOD, AND SOFTWARE APPLICATION FOR DISPLAYING DATA FROM A WEB SERVICE IN A VISUAL MAP

RELATED APPLICATIONS

This application is a continuation of U.S. patent application Ser. No. 14/726,856, filed on Jun. 1, 2015, which is a continuation of U.S. patent application Ser. No. 12/291,495, filed on Nov. 10, 2008, now U.S. Pat. No. 9,047,388, which is a continuation-in-part of U.S. patent application Ser. No. 10/882,556, filed on Jul. 1, 2004, now U.S. Pat. No. 9,038,001. All of the foregoing parent applications are incorporated by reference as if fully disclosed herein.

BACKGROUND OF THE INVENTION

1. Field of the Invention

This invention relates generally to visual mapping systems, and, more particularly, to displaying data from a web service in a visual map.

2. Description of the Background Art

Visual maps, such as mind maps and topic maps, provide an excellent way for users to view large amounts information in an organized, graphical format. A visual map is a diagram that represents ideas and/or information in topics. Examples of visual maps are mind maps, topic maps, semantic networks, and concept maps. Visual maps are increasingly used to help people generate, classify, and/or organize ideas and information and to see such ideas and information in a hierarchical, visual layout. Visual maps are used for project management, work-flow analysis, organizational charts, and other purposes.

FIG. 1 is an example of a visual map for information related to a wireless communication project meeting. The visual map in FIG. 1 is a mind map. Mind maps are made up of hierarchically-arranged topics. The main topics in FIG. 1 are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation." Users typically create topics in a visual map by inserting or importing text and graphic elements into topics.

Users typically create visual maps using proprietary visual mapping software. Mindjet LLC's MINDMANGER® and MINDJET CONNECT are examples of such software.

The Internet and the World Wide Web (the "Web") have made a wealth of information available to Internet users. Many companies and other entities have made data available via Web Services ("web services"). Web services are a web-based interface to a data source. A computer can make a call to a web service based on the web service's published API (application programming interface). For example, a company with a CRM system may have a web-service interface to the CRM system. This means that the CRM data can be obtained by a program that makes a call to the web service associated with the CRM system.

It would be desirable to enable a user to view web service data within a visual map. Therefore, there is a need for a visual map interface from which a user can initiate a web service call.

SUMMARY

The present invention provides a system, method, and software application for enabling a user to view data from an external data source in a visual map, wherein the external data source has a web services interface. A web service is a service made available from an entity's web server and accessible on the World Wide Web via the Internet.

Visual mapping software on a computer provides a visual mapping interface in which a user can create, edit, and/or view a visual map. Within the visual mapping interface, the visual mapping software provides the user with an option to obtain data from one or more data sources associated with a web service.

In response to the user selecting a data source associated with a web service, the visual mapping software determines whether or not the web service is associated with any user-configurable parameters. If so, the visual mapping software enables the user to enter user-configurable parameters.

After a user has entered any user-configurable parameters, the visual mapping software builds a web service request for the web service associated with the selected data source. The visual mapping application makes a call to the applicable web service with the web service request. The visual mapping application subsequently receives data from the web service and transforms the data into a format that can be used to generate visual map data. The visual mapping software then displays the data in a visual map.

In an alternate embodiment of the invention, the user need not initiate the web service request. In such alternate embodiment, the visual mapping software automatically makes a web service call (for example, upon launch of a visual map) and display the data from the web service in a visual map.

DETAILED DESCRIPTION OF THE PREFERRED EMBODIMENTS

The present invention provides a system, method, and software application for enabling a user to view data from an external data source in a visual map, wherein the external data source has a web services interface.

A web service is a service made available from an entity's web server and accessible on the World Wide Web via the Internet. A web service is a way to obtain data from an entity via a web interface. A computer can make a call to a web service based on the web service's published API (application programming interface). For example, a company with a CRM system may have a web-service interface to the CRM system. This means that the CRM data can be obtained by a program that makes a call to the web service associated with the CRM system.

Figure 1:
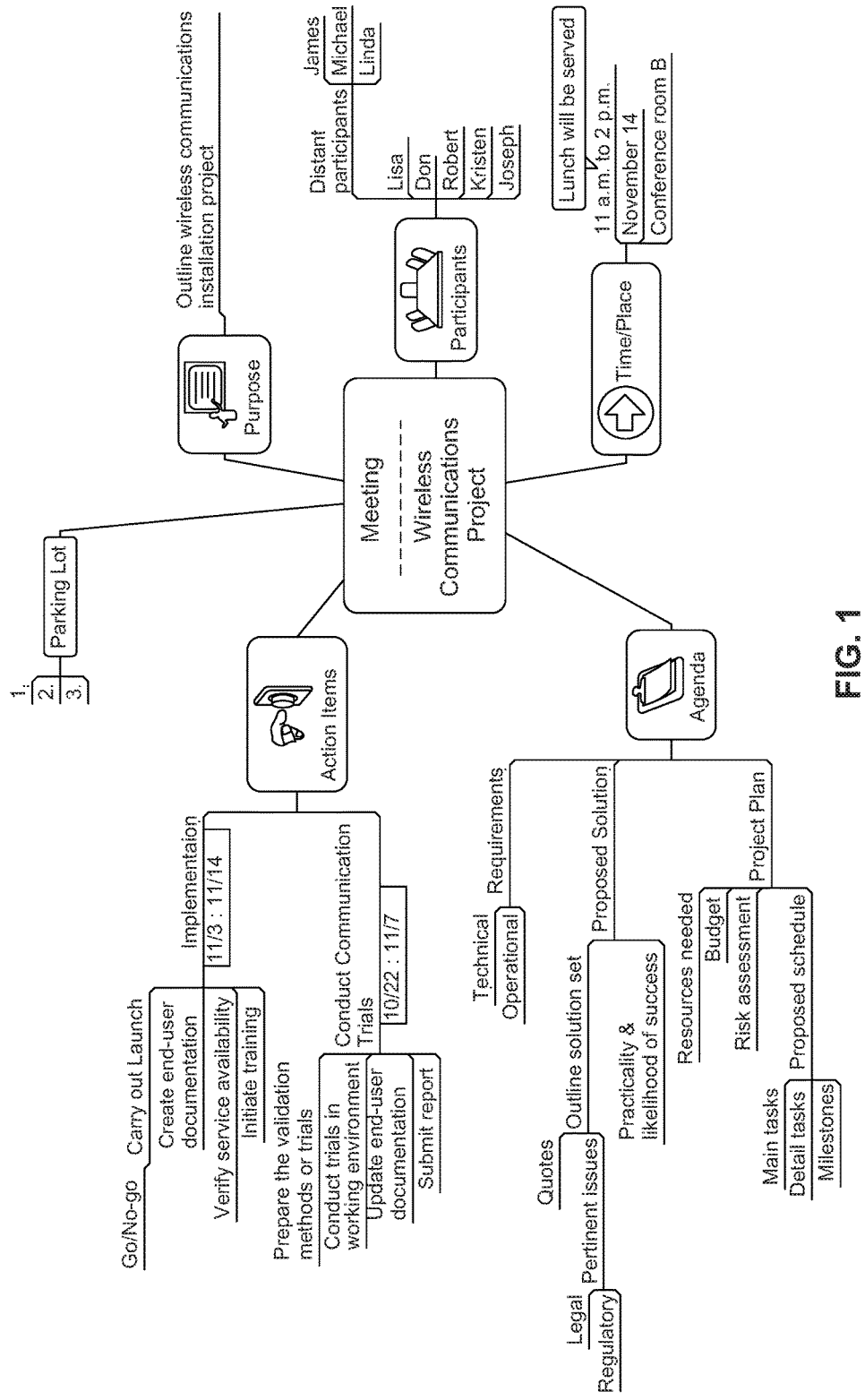
FIG. 1 is an example of a mind map.
Figure 2A:
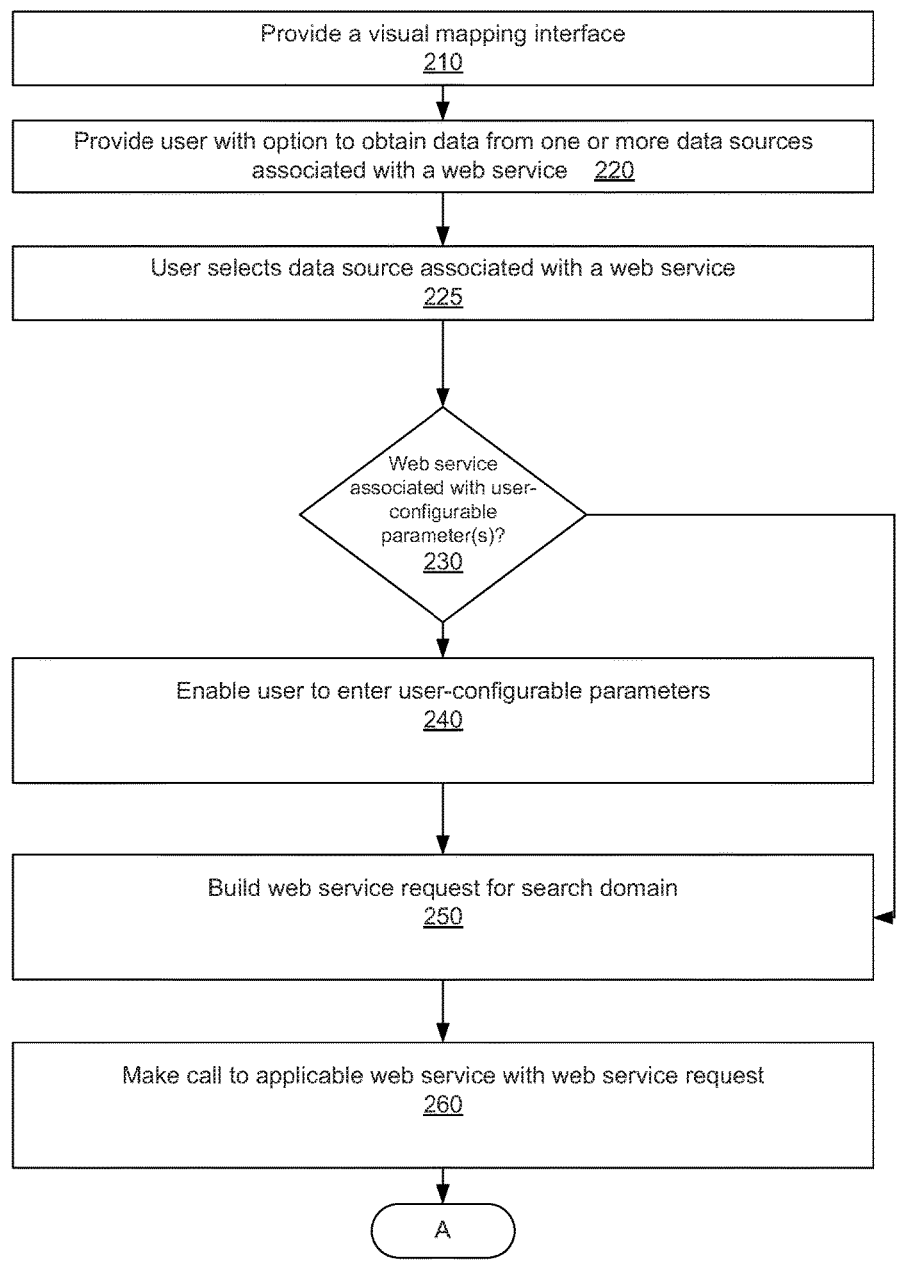
FIGS. 2a-b are a flowchart that illustrates a method, according to one embodiment of the present invention, for enabling a user to view data from a web service in a visual map.
Figure 2B:
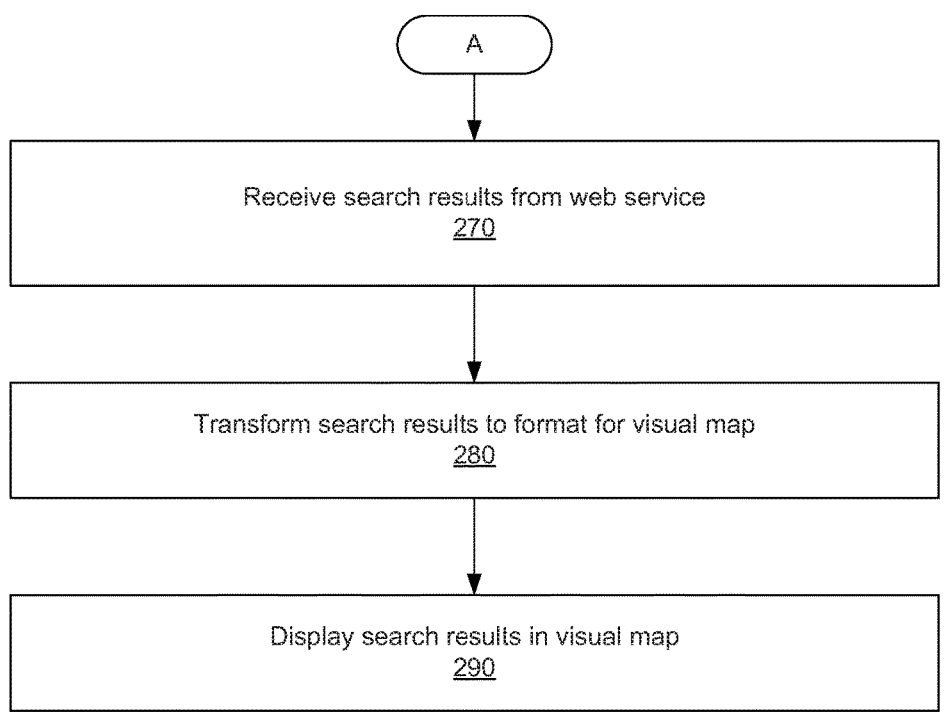

FIG. 2 illustrates a method according to one embodiment of the present invention. The method is implemented by visual mapping software running on a client computer (including, but not limited to, web browser-based applications) or a server computer. As stated above, Mindjet LLC's MINDMANAGER and MINDJET CONNECT software are examples of visual mapping software.

Referring to FIG. 2, visual mapping software on a computer provides a visual mapping interface in which a user can create, edit, and/or view a visual map (step 210).

Within the visual mapping interface, the visual mapping software provides the user with an option to obtain data from one or more data sources associated with a web service (220). Examples of the type of data that can be obtained from a web service include:

Search results from a search engine (e.g., GOOGLE, YAHOO, MSN)
Stock ticker information
Inventory system data
Human resource information
Data from databases that have a web-service interface There are multiple ways in which a user can initiate a web service request within the visual mapping interface. For example, the visual mapping interface may include icons representing data sources associated with a web service, and a user may click on one of the icons to import data from such data source.

In response to the user selecting a data source associated with a web service (step 225), the visual mapping software determines whether or not the web service is associated with any user-configurable parameters (step 230). If so, the visual mapping software enables the user to enter user-configurable parameters (step 240). In one embodiment, the visual mapping software provides a dialog box or form into which user can enter user-configurable parameters.

After a user has entered any user-configurable parameters, the visual mapping software builds a web service request for the web service associated with the selected data source (step 250). The web service request is built in accordance with the API for the web service. If the user has entered user-configurable parameters for the search, the web service request includes the user-configurable parameters, as well as any default parameters associated with the selected search domain. If there are no user-configurable parameters, then the web service request includes default parameters (if any).

After building a web service request, the visual mapping application makes a call, via the Internet, to the applicable web service with the web service request (step 260). The visual mapping application subsequently receives data from the web service (step 270). The visual mapping software transforms the data obtained from the web service into a format applicable to visual maps (step 280). For example, it is common for web service results to be in the form of XML. In such case, the visual mapping application may perform an XSLT transformation on the received data to transform it into an XML format from which a visual map can be generated. The visual mapping software then displays the data in a visual map (step 290).

In the method of FIG. 2, a user initiates the web service request from a visual mapping interface. However, in an alternate embodiment of the invention, the user need not initiate the web service request. In such alternate embodiment, the visual mapping software automatically makes a web service call (for example, upon launch of a visual map) and display the data from the web service in a visual map.

In one embodiment, when a user selects a data source associated with a web service, the visual mapping software retrieves a web service "definition" for the data source. A web services "definition" specifies (i) the parameters associated with the web service request, (ii) the requirements for building a web service request, and (iii) instructions on how to handle and transform the data returned from the web service request.

Figure 3:
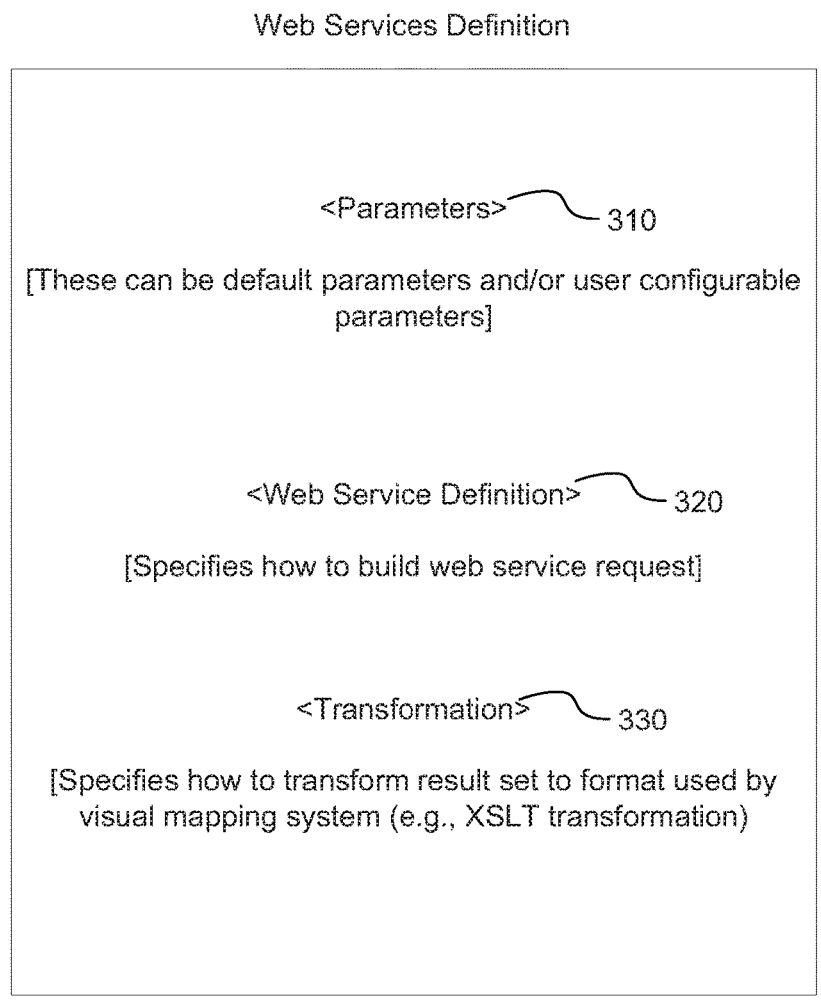
FIG. 3 illustrates an outline of a web service definition.

FIG. 3 illustrates an example outline of a web services definition. The definition includes a Parameters section 310 that specifies any default parameters or user-configured parameters that should be included in a web service request. The Web Service Definition section 320 specifies how to build a web service request for the particular web service associate with the definition. The rules in this section ensure that the web service request is compatible with the API for the web service. The Transformation section 330 specifies how to transform data received from the web service to a data format used by the visual mapping system. In the preferred embodiment, the data from a web services is in XML format, and the transformation is a XSLT transformation that transforms the XML data from the Web Service into an XML format used by the visual mapping software. In one embodiment, a web service definition is an XML file that is compiled into a search map part.

Figure 4A:
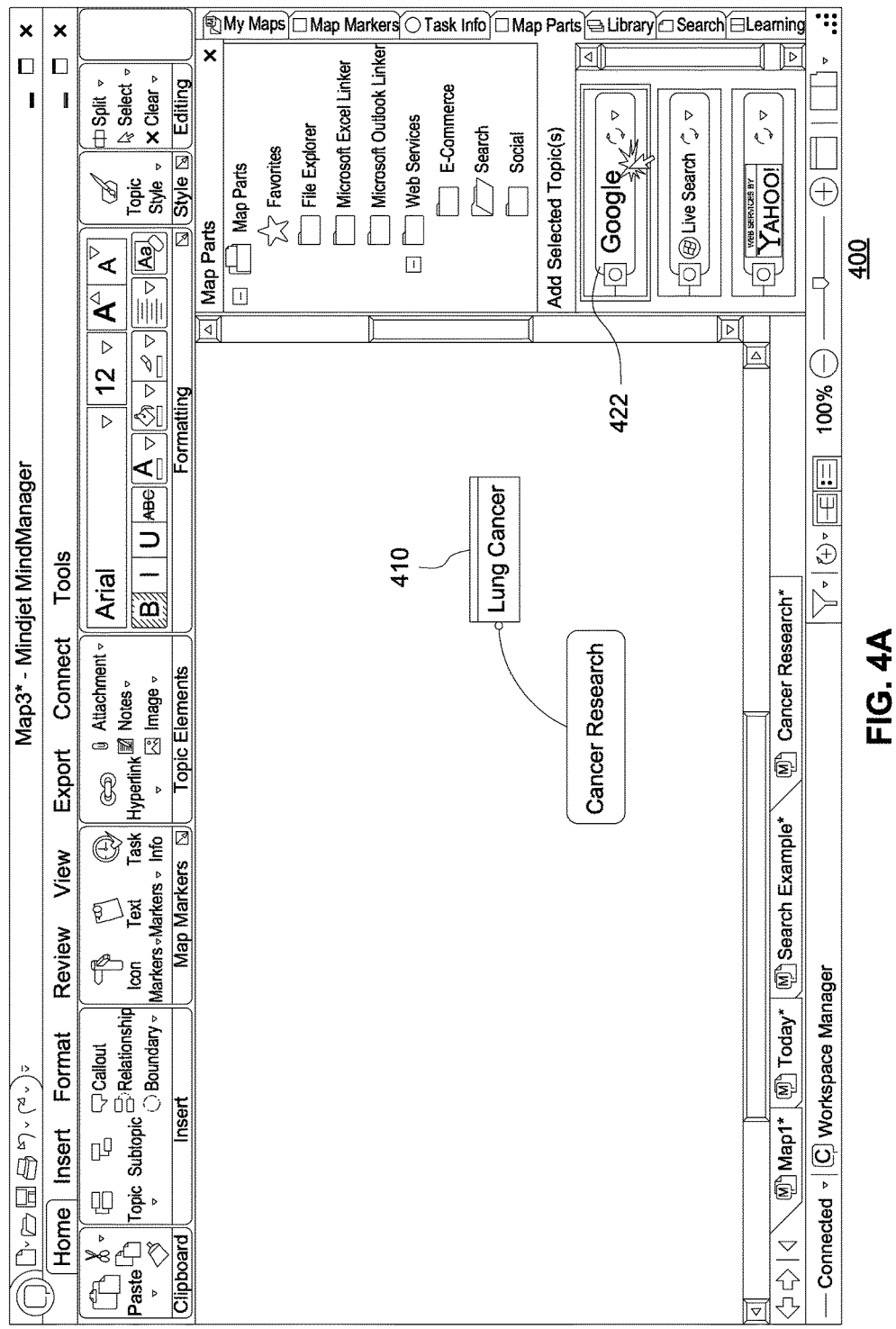
FIGS. 4a-c are screen shots of a visual mapping interface, wherein the screen shots illustrate an example implementation of the present invention
Figure 4B:
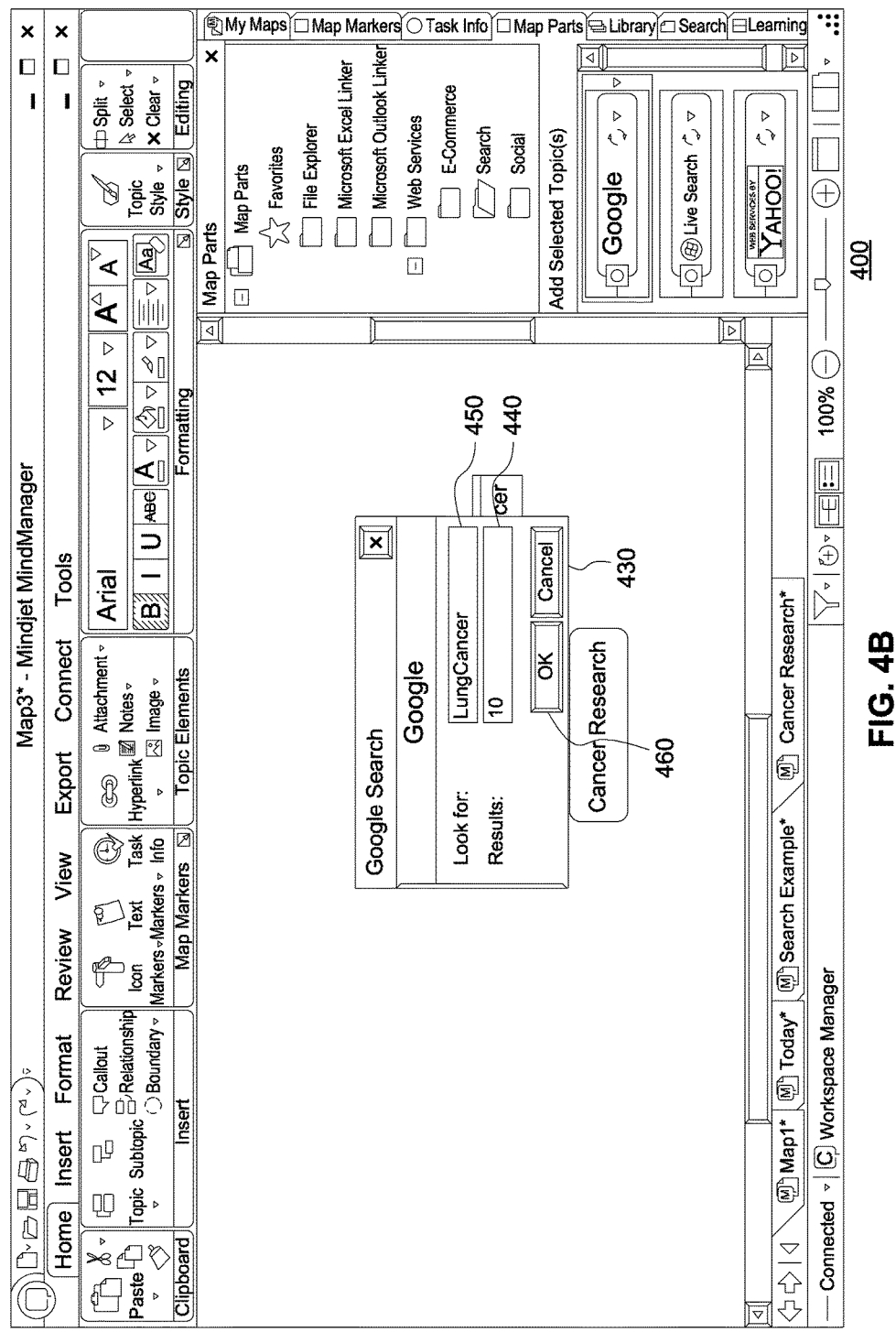
Figure 4C:
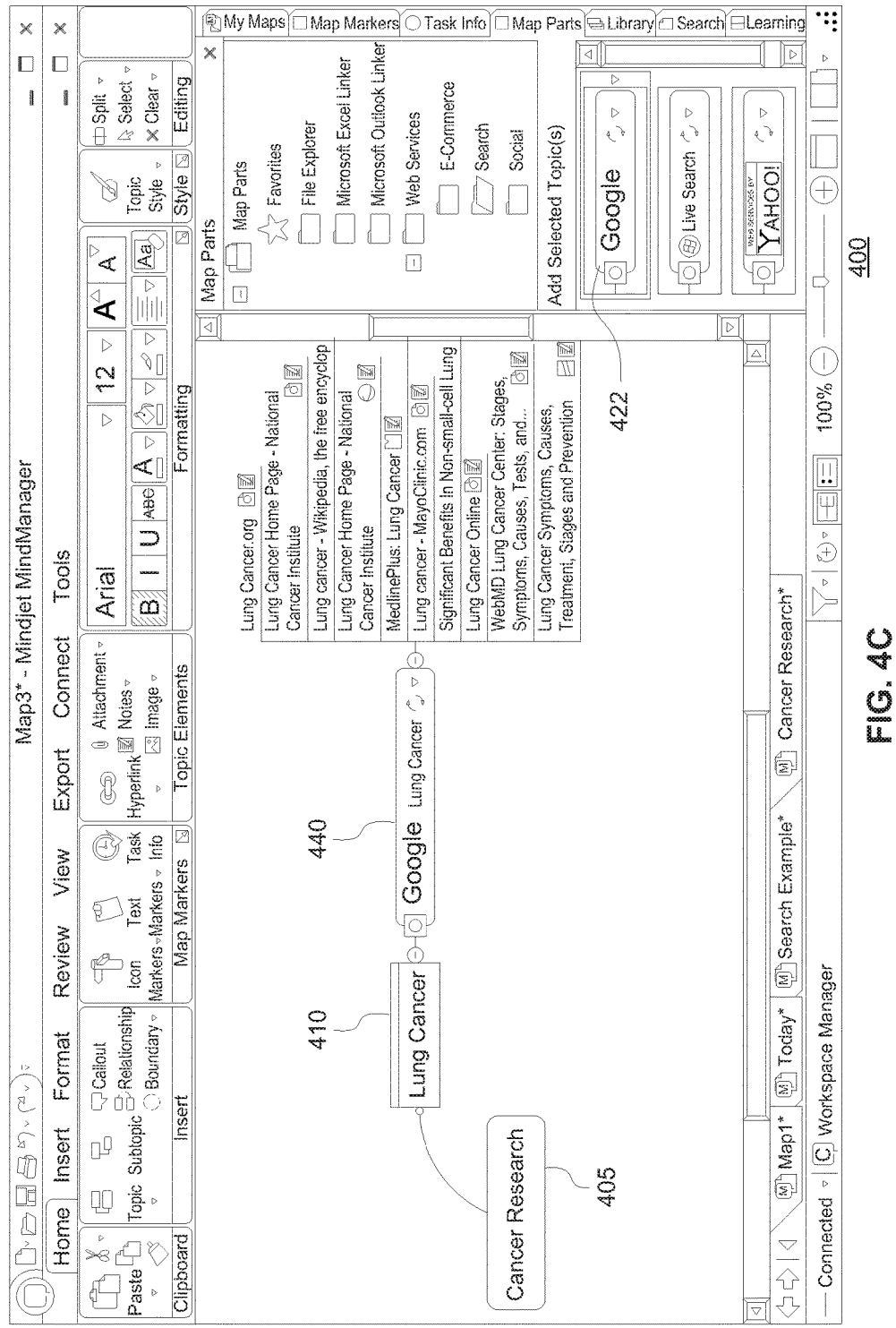

FIGS. 4a-4c illustrate an example implementation of the present invention. In this example, a user has the option to obtain search results from several search engines that have a web services interface, namely GOOGLE, YAHOO, and LIVE SEARCH. Although the web services in this example are associated with search engines, this invention is not limited to search engines. The invention can be used to obtain and view data in a visual map from any data source having a web services interface.

In the present example, the user selects a search domain by either (i) dragging an icon representing a search domain to a topic with search terms or (ii) selecting a topic with search terms and clicking on an icon representing the search domain.

In FIG. 4a, a user has selected topic 410 in visual map interface 400 and clicked on the GOOGLE icon 422 to initiate a GOOGLE search for "Lung Cancer."

In the example of FIGS. 4a-4c, the number of search results displayed is a user-configurable parameter. When a user selects the GOOGLE search domain, a dialog box 430 appears (FIG. 4b). The dialog box 430 includes a "Results" field 440 into which a user can specify the number of search results he/she wants to see in the visual map. A default parameter may initially be displayed in field 440. The dialog box 430 also includes a search terms field 450 (i.e., the "Look for" field). In this example, the default entry for search terms field 450 is "Lung Cancer," as these are the terms entered into topic 410. Dialog box 430 gives the user the opportunity to change the search terms.

After the user selects the "OK" button 460 in dialog box 430, the visual mapping software builds a web services request for GOOGLE, where the request specifies that the search terms are "Lung Cancer" and the number of search results desired is ten. The GOOGLE web service then returns the top ten search results for "Lung Cancer" on the GOOGLE search engine. FIG. 4c illustrates the results from a Google search of "Lung Cancer" displayed in a visual map.

The visual map in FIG. 4c includes a topic 440 that indicates that GOOGLE was the search domain associated with the search results displayed. In this example, topic 440 was added as a subtopic to topic 410 in response to the user selecting GOOGLE as the search domain. Topic 440 is referred to herein as a web services "map part" (the Google icon 422 is also considered a "map part" that became topic 440). By displaying data from a web service as subtopics to a web service map parts in the map, a user viewing the map can see the web service that was used to obtain data. This can be helpful if the user viewing the map was not the user who created the map.

Web service map parts can be added at any level of the map. For example, in FIGS. 4a-4c, a search web services map part can be added as a subtopic to (i) the central topic "Cancer Research" 405, (ii) the "Lung Cancer" topic 410, or (iii) any of the search results displayed in FIG. 4c. In addition, a web services map part can be the central topic of a map. In one embodiment a web services map part is a type of content-specific topic, where one of the properties of the topics is that is able to make a call to a web service (e.g., software code capable of performing the method of FIG. 2 is compiled into the topic). A content-specific topic is designed specifically for a type of content. One implementation of content-specific topics are described in U.S. patent application Ser. No. 11/478,220, titled "System and Method for Providing Content-Specific Topics in a Mind Mapping System," and filed on Jun. 29, 2006, the contents of which are incorporated by reference as if fully described herein.

Figure 5:
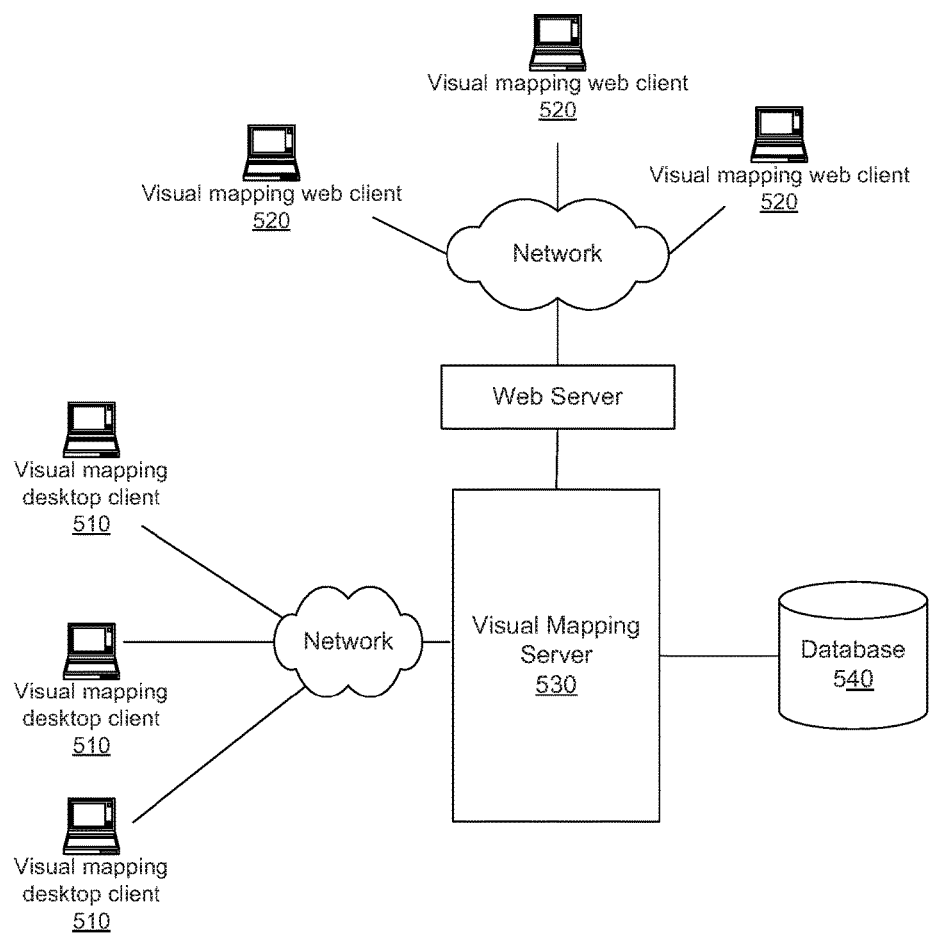
FIG. 5 is a block diagram that illustrates an example of a visual mapping system.

FIG. 5 illustrates an example of a visual mapping system 500 in which the present invention can be implemented. Visual mapping system 500 is only an example, and the invention is not limited to this example.

In system 500, a user can create visual map from a visual mapping desktop client 510 or a visual mapping web client 520. These visual mapping clients 510, 520 are served by a visual mapping server 530. Mindjet LLC's MINDJET CONNECT is an example of a visual mapping server application. After a user creates or edits a visual map, the visual mapping client (510 or 520) sends the map data to the visual mapping server 530, which stores the data in a file system or a database 540. Visual maps with web service data can be saved and shared with other users. In one embodiment, web services data is refreshed when a map with a web services map part is opened (i.e., a web service call is made each time the map is opened).

A visual map can be stored as a file, or the topics in a map can be stored in individually in a database, as described in U.S. patent application Ser. No. 12/001,533 titled "System and Method for Enabling a User to Search and Retrieve Individual Topics in a Visual Mapping System," which was filed on Dec. 12, 2007 and which is incorporated by reference as if fully disclosed herein.

The method of FIG. 2 can be implemented by the visual mapping client (510 or 520) in conjunction with the visual mapping server 530. The method of FIG. 2 can also be implemented by visual mapping software running in an external application, such as the visual mapping software with the network module described in the U.S. patent application titled "System, Method, and Software Application for Enabling a User to View and Interact with a Visual Map in a Non-Visual Mapping Application," filed on Nov. 10, 2008, and having inventors Neil S. Mendelson, William J. Creekbaum, and Andriy O. Mochalskyy, the content of which are incorporated by reference herein.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A system enabling a user to view data from an external data source in a visual map, wherein the external data source has a web service interface, the method comprising:

receiving from a user via an interface of a computer connected to a global communications network a plurality of inputs via a user interface of the computer relating to the addition of a web service map part to a visual map;

creating with a first microprocessor of the computer a web service request relating to the web service map part for transmission to an external data source connected to the global communications network in dependence upon the plurality of inputs;

transmitting the web service request to the external data source from the computer via the global communications network;

receiving upon the computer from the external data source data generated by the external data source in dependence upon the web service request, the data relating to the web service map part the user wants to add to the visual map;

transforming upon the computer with the first microprocessor the received data relating to the web service map part to a format suitable for use in generating visual map content comprising the web service map part and the visual map; and rendering the visual map content to the user upon a display of the computer; wherein the first microprocessor executes first computer readable instructions stored within a first non-volatile non-transitory storage medium forming part of the computer to provide the user of the computer with a visual mapping interface that enables the user to add to the visual map rendered upon the display one or more map parts associated with software code capable of making a call to a web service interface (the "web service map part"), wherein a user is able to add the web service map part as a topic or a subtopic to the visual map;

the external data source comprises a second non-volatile non-transitory storage medium storing the data and second computer readable instructions relating to the web service interface and a second microprocessor for executing the second computer readable instructions in response to a web service request received via the web service interface to retrieve the data and transmit it via the web service interface;

the rendered data received from the web service interface in response to the web service request is rendered as either within the web service map part or as subtopics to the web service map part; and the web service interface in response to the web service request received via the global communications network retrieves the data from the second non-volatile non-transitory storage medium and transmits it to the computer via the global communications network.

2. The system of claim 1, wherein the data from the external data source is received in XML format and an XSLT transformation is applied to the data from the web service to transform the data into another XML format used to generate the visual map content.

3. The system of claim 1, wherein the external data source is a Customer Relationship Management (CRM) system.

4. The system of claim 1, wherein the external data source is a server that provides weather information.

5. The system of claim 1, wherein the external data source is a server that provides stock quote information.

6. The system of claim 1, wherein the external data source is a server that provides human resource information.

7. The system of claim 1, wherein the external data source is a database with a web service interface.

8. A system for enabling a user to view data from an external data source in a visual map, wherein the external data source has a web service interface, the method comprising:
 a computer connected to a global communications network comprising a display, a first non-volatile non-transitory storage medium, a user input interface, and a first microprocessor executing first computer readable instructions stored within the first non-volatile non-transitory storage medium to provide to a user of the computer a visual mapping interface that enables a user to add to a visual map rendered upon the display one or more map parts associated with software code capable of making a call to a web service (a "web service map part"), wherein a user is able to add a web service map part as a topic or a subtopic to a visual map;
 the external data source also connected to the global communications network comprising a second non-volatile non-transitory storage medium storing the data and second computer readable instructions relating to the web service interface and a second microprocessor for executing the second computer readable instructions; wherein
 the visual mapping interface:
  receives from a user of the computer a plurality of first inputs made via the user input interface of the computer, the plurality of first inputs relating to the addition of the web service map part to the visual map;
  determines whether or not a web service request to be created and transmitted to the external data source in dependence upon the plurality of first inputs is associated with any user-configurable parameters;
  in response to determining that the web service request is associated with one or more user-configurable parameters providing to the user upon the display of the computer the one or more user-configurable parameters and receiving from the user one or more second inputs via the user input interface of the computer relating to the one or more of the user-configurable parameter(s), and
  generating the web service request such that it includes any user-configurable parameters established via the one or more second inputs, any default parameters for the web service request, and the plurality of first inputs relating to the addition of the web service map part to the visual map;
  transmits the web service request to the web service interface associated with the external data source;
  receives data from the web service interface retrieved from the second non-volatile non-transitory storage medium within the external data source in dependence upon the web service request; and
  transforms the received data relating to the web service map part into a format suitable for use in generating visual map content comprising the web service map part and the visual map; and
  renders the visual map content to the user upon the display of the computer;
 the data is rendered either in the web service map part or as subtopics to the web service map part, and
 the rendered data conforms to any user-configurable parameters and any default parameters.

9. The system of claim 8, wherein the data from the external data source is received in XML format and an XSLT transformation is applied to the data from the web service to transform the data into another XML format used to generate visual map content.

10. The system of claim 8, wherein the external data source is a Customer Relationship Management (CRM) system.

11. The system of claim 8, wherein the external data source is a server that provides weather information.

12. The system of claim 8, wherein the eternal data source is a server that provides stock quote information.

13. The system of claim 8, wherein the external data source is a server that provides human resource information.

14. The system of claim 8, wherein the external data source is a database with a web service interface.

15. A computer program embodied on a non-transitory computer-leadable medium and comprising code, that, when executed by a computer, enables the computer to execute a process comprising the steps of:
 rendering upon a display associated with the computer a visual mapping interface allowing a user to add to a visual map rendered upon the display one or more map parts, wherein the user is able to add the one or more map parts established in response to a web service request made to a remote external data source coupled to the computer via a global communications network (a "web service map part") as a topic or a subtopic to a visual map;
 obtaining the one or more map parts from the remote external data source by generating the web service request and processing data received from the external data source in response to the web service request by:
  receiving from the user via an interface of the computer connected to a global communications network a plurality of inputs via a user interface of the computer relating to the addition of a web service map part to a visual map;
  creating with a first microprocessor of the computer the web service request in dependence upon the plurality of inputs for transmission to the remote external data source;
  transmitting the web service request to the remote external data source from the computer via the global communications network;
  receiving upon the computer from the remote external data source data generated by the remote external data source in dependence upon the web service request, the data relating to the web service map part the user wants to add to the visual map;
  transforming upon the computer with the first microprocessor the received data relating to the web service map part to a format suitable for use in generating visual map content comprising the web service map part and the visual map; and
 rendering the visual map content upon the display; wherein
 rendering the data received from the web service interface in response to the web service request is either within the web service map part or as subtopics to the web service map part.

16. The computer program of claim 15, wherein the data is received in XML format and an XSLT transformation is applied to the data from the web service to transform the data into another XML format used to generate visual map content.

17. The computer program of claim 15, wherein the external data source is a Customer Relationship Management (CRM) system.

18. The computer program of claim 15, wherein the external data source is a server that provides weather information.

19. The computer program of claim 15, wherein the eternal data source is a sewer that provides stock quote information.

20. The computer program of claim 15, wherein the external data source is a server that provides human resource information.

21. The computer program of claim 15, wherein the external data source is a database with a web service interface.

22. A computer program embodied on a non-transitory computer-leadable medium and comprising code, that, when executed by a computer, enables the computer to execute a process comprising the steps of:

rendering upon a display associated with the computer a visual mapping interface allowing a user to add to a visual map rendered upon the display one or more map parts, wherein the user is able to add the one or more map parts established in response to a web service request made to a remote external data source coupled to the computer via a global communications network (a "web service map part") as a topic or a subtopic to a visual map;

obtaining the one or more map parts from the remote external data source by generating the web service request and processing data received from the external data source in response to the web service request by:

receiving from a user of the computer a plurality of first inputs made via the user input interface of the computer, the plurality of first inputs relating to the addition of the web service map part to the visual map;

determining whether or not a web service request to be created and transmitted to the external data source in dependence upon the plurality of first inputs is associated with any user-configurable parameters;

in response to determining that the web service request is associated with one or more user-configurable parameters providing to the user upon the display of the computer the one or more user-configurable parameters and receiving from the user one or more second inputs via the user input interface of the computer relating to the one or more of the user-configurable parameter(s), and generating the web service request such that it includes any user-configurable parameters established via the one or more second inputs, any default parameters for the web service request, and the plurality of first inputs relating to the addition of the web service map part to the visual map;

transmitting the web service request to the web service interface associated with the external data source;

receiving data from the web service interface retrieved from the second non-volatile non-transitory storage medium within the external data source in dependence upon the web service request; and transforming the received data relating to the web service map part into a format suitable for use in generating visual map content comprising the web service map part and the visual map; and rendering the visual map content to the user upon the display of the computer; wherein the data is rendered either in the web service map part or as subtopics to the web service map part, and the rendered data conforms to any user-configurable parameters and any default parameters.

23. The system of claim 1, wherein the external data source is a computer having a web service interface.

24. The system of claim 8, wherein the external data source is a computer having a web service interface.

25. The computer program of claim 15, wherein the external data source is a computer having a web service interface.

26. The computer program of claim 22, wherein the external data source is a computer having a web service interface.

* * * * *